Figure 1:
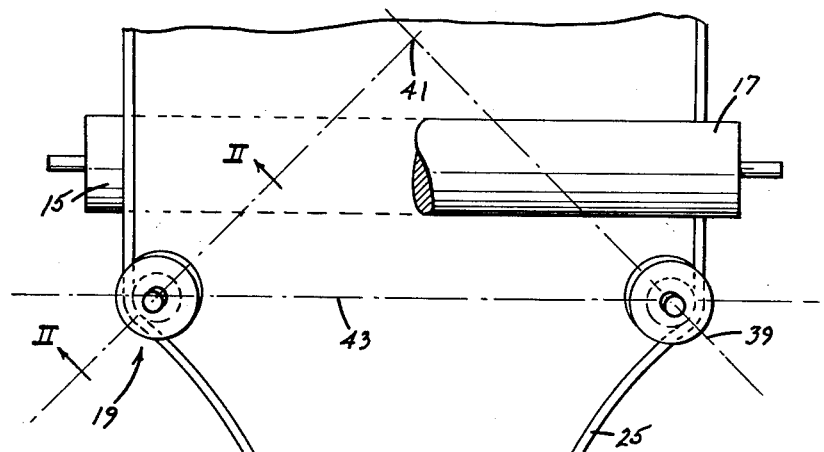

June 30, 1964     W. H. BROWN, JR., ETAL     3,138,824

FILM STRETCHING APPARATUS

Filed June 4, 1963

United States Patent Office 3,138,824
Patented June 30, 1964

3,138,824
FILM STRETCHING APPARATUS
William H. Brown, Jr., Drexel Hill, and Robert J. Getty, West Chester, Pa., assignors, by mesne assignments, to FMC Corporation, San Jose, Calif., a corporation of Delaware
Filed June 4, 1963, Ser. No. 285,358
8 Claims. (Cl. 18—1)

The present invention relates to the manufacture of plastic films and particularly to an improved apparatus for stretching of crystalline polymeric materials to improve the properties thereof.

In the conventional manufacture of films from thermoplastic polymeric materials, as for example from polyethylene and polypropylene, the molten polymer is extruded as a continuous sheet and is then rapidly quenched, as for example by a cool liquid or gas. To convert this film to a more useful article, the film is generally oriented by being stretched in two mutually perpendicular or biaxial directions, preferably simultaneously, to form a superior film in which the physical properties, such as tensile strength, elongation, etc., are balanced or substantially the same as measured in both directions.

To facilitate longitudinal and transverse stretching of a continuous film, the film may be initially formed with a web and thickened or beaded longitudinal edges. Biaxial stretching of such film may be achieved by directing the beaded edges of the film along diverging paths while the film web and beaded edges are together tensioned in a longitudinal direction. While various apparatus have been proposed for effecting biaxial stretching of beaded edge films, none has proven to be entirely satisfactory from the standpoints of providing for stretching of the film web without undesired distortion and/or uninterrupted stretching operations. Accordingly, a primary object of this invention is to provide a new or improved and more satisfactory apparatus for stretching continuous beaded edge films.

Another object is the provision of an improved apparatus for stretching a film having a web and beaded edges without distorting or otherwise damaging the surfaces of the film web.

Still another object is the provision of an improved apparatus for effecting continuous stretching of a beaded edge film notwithstanding variations in the size or shape of the film edges.

These and other objects are accomplished with the present invention by an improved apparatus which includes a pair of feed rolls, a pair of pull rolls spaced longitudinally from the feed rolls and two pairs of laterally spaced stretch plates or discs which are located between the feed and pull rolls. The film to be stretched by the apparatus of the present invention includes a web which is of substantially uniform thickness across its entire width and thickened or beaded longitudinal edges, the latter of which are adapted to be engaged with peripheral portions of the pairs of discs and be directed along diverging paths as they approach and are advanced in-between the pull rolls. As with conventional apparatus, suitable means may be provided for heating the film prior to and/or during the stretching operation and for rotating the pull rolls at a greater rate of speed than that of the feed rolls so as to exert longitudinal stretching forces on the film.

In the apparatus of the present invention, the discs of each pair of discs are disposed so that the opposing faces thereof are in spaced apart relationship and are inclined in opposite directions, with their axes having an apex along the path of the film which is being stretched. With this arrangement, the opposing faces of the stretching discs are well removed from the opposite sides of the film web and thus will have little or no tendency to distort or twist such web in the event that the film should flutter or otherwise move from its intended path of travel. For most satisfactory operations, the discs should each be inclined an angle of from 2° to 15°, and more preferably about 5°, from a plane which is perpendicular to the plane of the film which is being stretched.

In addition to the inclination mentioned above, the discs are positioned so that the axes of the respective pairs of discs lie along planes which intersect along the film path and beyond a transverse plane passing through such pairs of discs. These intersecting planes may each extend at an angle of from 15° to 75°, and preferably about 45°, from a plane extending transversely across the plane of the film which is being stretched. When the pairs of discs are so oriented, the beaded edges of the film move smoothly into engagement with the peripheral portions of the discs without any tendency to wedge or bind with the edges thereof. Further, since the pairs of discs are engaged with substantial lengths of the opposite edges of the film, variations in the size or shape of a beaded edge along a short segment of its length and/or a momentary irregular elongation of such beaded edge would not normally interrupt stretching operations.

Preferably, the peripheries of each pair of discs are undercut in the areas adjacent to their opposing faces. In effect, these undercut portions of the respective pairs of discs form channels which receive the beaded edges of the film and minimize movement of the film web from a predetermined plane. If desired, at least one disc of each pair of discs may be positively driven by suitable means to assist in advancing and perhaps in longitudinally stretching of the film.

As will be apparent from the following detailed description, the apparatus of the present invention is in no way limited to any particular film material but is useful in orienting beaded edge films formed from a variety of thermoplastic polymeric materials, as for example, polypropylene, polyethylene, etc.

Figure 2:
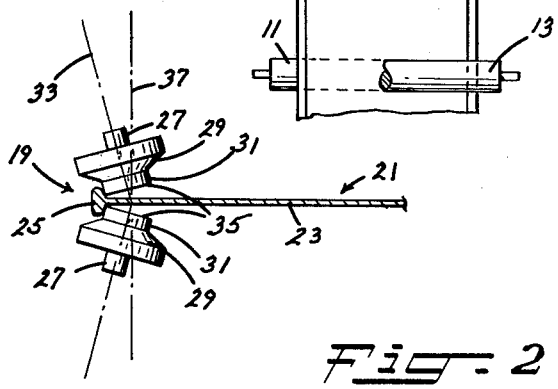

In the drawing, FIGURE 1 is a plan view illustrating the apparatus of the present invention in use; and FIGURE 2 is a vertical section taken along the line II—II of FIGURE 1.

With reference to the drawing for a more detailed description of the invention, the apparatus of the present invention includes a pair of feed rolls 11 and 13, a pair of pull rolls 15 and 17 spaced longitudinally from the feed rolls and two pairs of stretch plates or discs 19. The film to be stretched is indicated by the character 21 and includes a web 23 which is of substantially uniform thickness across its entire width and thickened or beaded longitudinal edges 25. Stretching of the film 21 is achieved as it travels between the pairs of feed and pull rolls and suitable means, not shown, are provided for heating the film prior to and/or during the actual stretching operation.

The feed rolls 11 and 13 are positively driven at a uniform and constant speed so as to deliver the film 21 into the stretching zone at a predetermined metered rate of speed. The pull rolls 15 and 17 are likewise positively driven at a uniform rate of speed, and preferably at a speed which is greater than that of the feed rolls 11 and 13 so as to longitudinally stretch the film 21 concomitantly with its advancement.

The pairs of stretch discs 19 are disposed between the pairs of feed and pull rolls and are intended to direct the film beaded edges 25 along diverging paths as the film approaches and moves in-between the pull rolls. Carriages or other similar means are provided for moving the pairs of discs transversely of the film path so that the apparatus can be adapted for use with films of various widths and to permit films of the same width to be stretched to different degrees. The discs 19 of each pair of discs are formed with shafts 27 and are undercut as shown at 29 to provide opposing projections 31 which engage with an adjacent edge 25 of the film 21 along opposite sides of the film web 23. In effect, the undercut portions 29 of a cooperating pair of discs together provide a channel which guides a beaded edge of the film 21 along a desired path and also minimizes movement of the film away from a predetermined plane.

As seen in FIGURE 2, the discs 19 of each pair of discs are inclined in opposite directions relative to the plane of the film 21 so that their axes, indicated by the character 33, have an apex along the film path and adjacent to a beaded edge of the film. Such inclination of the discs 19 prevents their opposing faces 35 from contacting and distorting the film web in the event that the film 21 flutters or is otherwise moved from an intended plane. Desirably, the axes 33 of the respective discs should be inclined about 2° to 15°, and more preferably about 5°, away from a plane 37 which extends perpendicular to the plane of the film 21.

Referring to FIGURE 1, it will be noted that the axes of the respective pairs of discs lie along planes 39 which intersect, as indicated at 41, along the path of the film 21 and beyond a transverse plane 43 passing through the pairs of discs. Such planes 39 may be inclined from about 15° to 75° and more preferably about 45°, from the plane 43.

In using the above-described apparatus, the unstretched film 21 is first laced between the pair of feed rolls 11 and 13 and then between the pair of pull rolls 15 and 17. The discs 19 of the respective pairs of discs are separated from each other a distance at least slightly greater than the thickness of the film beaded edge 25 and are then moved into position along opposite sides of the film web 23. The gap between the discs of each pair of discs is then reduced until the respective pairs of discs engage with the film beaded edges 25 in a manner as shown in FIGURE 2. The feed and pull rolls are now set in motion and the pairs of discs are urged laterally away from each other until the film web 23 is under the desired transverse stretching forces.

The pull rolls 15 and 17 are driven at a faster rate of speed than the feed rolls 11 and 13 so that both the film web 23 and beaded edges 25 are subjected to longitudinal stretching tensions. The pairs of discs 19 positively urge the beaded edges of the film along diverging paths as they approach and move in-between the pair of pull rolls so that the film web 23 is stretched transversely concomitantly with the longitudinal stretching thereof. The stretched film is permitted to cool after leaving the pull rolls, if necessary, and is then collected by being wound upon itself.

It is to be understood that changes and variations may be made without departing from the spirit and scope of the invention as defined in the appended claims.

We claim:

1. Apparatus for stretching a beaded-edge film including a pair of feed rolls, a pair of pull rolls spaced longitudinally from said feed rolls, and two pairs of rotatable discs positioned between said pairs of feed and pull rolls for engaging peripheral portions thereof with the beaded edges of the film and directing the same along diverging paths as they approach and are advanced between said pull rolls, the discs of each pair of discs being disposed in spaced apart relationship and being inclined in opposite directions so that the axes thereof have an apex along the path of the film to be stretched and wherein the axes of the respective pairs of discs lie along planes which intersect at a location beyond said pairs of discs.

2. Apparatus as defined in claim 1 wherein the axis of each disc is inclined at an angle of not less than about 2° from a plane which extends perpendicular to the plane of the film to be stretched.

3. Apparatus as defined in claim 1 wherein the axes of the respective pairs of discs lie along planes which extend at an angle of from about 15° to 75° from a plane extending transversely across the path of the film to be stretched.

4. Apparatus for stretching a beaded-edge film including a pair of feed rolls, a pair of pull rolls spaced longitudinally from said feed rolls, and two pairs of rotatable discs positioned between said pairs of feed and pull rolls for engaging peripheral portions thereof with the beaded edges of the film and directing the same along diverging paths as they approach and are advanced between said pull rolls, said discs of each pair of discs being disposed in spaced apart relationship along opposite sides of the path of the film to be stretched and being inclined at opposite angles to the plane of such film so that their axes have an apex therein close to its beaded edge, and wherein the axes of the respective pairs of discs lie along planes which intersect at a location along the film path and beyond said pairs of discs.

5. Apparatus as defined in claim 4 wherein the axis of each disc is inclined at an angle of from about 2° to 15° from a plane extending perpendicular to the plane of the film to be stretched.

6. Apparatus as defined in claim 5 wherein the axes of the respective pairs of discs lie along planes which extend at an angle of from 15° to 75° from a plane extending transversely across the path of the film to be stretched.

7. Apparatus as defined in claim 4 wherein the axis of each disc is inclined an angle of about 5° from a plane extending perpendicular to the plane of the film to be stretched and wherein the axes of the respective pairs of discs lie along planes which extend at an angle of about 45° from a plane extending transversely across the film path.

8. Apparatus as defined in claim 4 wherein the peripheries of the discs of each pair of discs undercut adjacent to their opposing faces to provide annular projections which are of smaller diameter than the remaining portions of such discs, and wherein the peripheral portions of said annular projections are adapted to engage with the beaded edges of the film during the stretching thereof.

References Cited in the file of this patent

UNITED STATES PATENTS

| 2,581,821 | Sutton | Jan. 8, 1952 |
| 2,778,057 | Clark | Jan. 22, 1957 |
| 2,988,772 | Horn | June 20, 1961 |
| 3,078,504 | Koppehele | Feb. 26, 1963 |

OTHER REFERENCES

| 753,603 | Great Britain | July 28, 1926 |